(12) United States Patent
Dinescu

(10) Patent No.: US 7,793,135 B2
(45) Date of Patent: Sep. 7, 2010

(54) MOBILE EQUIPMENT WITH TIME CONTROL FOR DRM SCHEMES

(75) Inventor: Dan Dinescu, Munich (DE)

(73) Assignee: Sony Ericsson Mobile Communications AB (SE)

( * ) Notice: Subject to any disclaimer, the term of this patent is extended or adjusted under 35 U.S.C. 154(b) by 989 days.

(21) Appl. No.: 10/549,491

(22) PCT Filed: Jan. 29, 2004

(86) PCT No.: PCT/EP2004/000798

§ 371 (c)(1),
(2), (4) Date: Jul. 3, 2006

(87) PCT Pub. No.: WO2004/084048

PCT Pub. Date: Sep. 30, 2004

(65) Prior Publication Data

US 2006/0265623 A1    Nov. 23, 2006

(30) Foreign Application Priority Data

Mar. 20, 2003    (EP) .................... 030062467

(51) Int. Cl.
| | |
|---|---|
| *G06F 1/04* | (2006.01) |
| *G06F 11/30* | (2006.01) |
| *G06F 7/04* | (2006.01) |
| *H04W 24/00* | (2009.01) |
| *G04C 11/02* | (2006.01) |
| *G04C 9/00* | (2006.01) |
| *H04N 7/00* | (2006.01) |
| *G01S 1/04* | (2006.01) |
| *G06F 1/00* | (2006.01) |
| *G06F 1/14* | (2006.01) |
| *G06F 21/00* | (2006.01) |

(52) U.S. Cl. .................. 713/600; 713/193; 726/26; 455/425; 368/47; 368/66

(58) Field of Classification Search .................. 713/600, 713/193; 726/26; 455/425; 368/66, 47
See application file for complete search history.

(56) References Cited

U.S. PATENT DOCUMENTS 6,282,431 B1 *    8/2001    Konno .................. 455/425

(Continued)

FOREIGN PATENT DOCUMENTS

EP    1801609 A1 *    6/2007

(Continued)

OTHER PUBLICATIONS

M. Schläger, B. Rathke, A. Wolisz, S. Bodenstein, "Advocating a remote socket architecture for internet access using wireless LANs", Jan. 2001, Mobile Networks and Applications, vol. 6 Issue 1, Publisher: Kluwer Academic Publishers, pp. 23-42.*

(Continued)

*Primary Examiner*—Matthew B Smithers
*Assistant Examiner*—Courtney D Fields
(74) *Attorney, Agent, or Firm*—Myers Bigel Sibley & Sajovec, P.A.

(57) ABSTRACT

The present invention provides a mobile equipment for non stationary use. The mobile equipment includes a real time clock (RTC) integrated in the mobile equipment for generating a real time information, a system time generator integrated in the mobile equipment for generating a system time information by adding an offset to the real time information given by the RTC, a non-volatile memory for the permanent storage of data and an input means for inputting instructions for changing the system time information. The possible changes of the system time information generated by the system time generator may be limited to a preset time range and the possible reset value of the RTC may be limited according to the data stored in the non-volatile memory.

9 Claims, 2 Drawing Sheets

U.S. PATENT DOCUMENTS

| | | | |
|---|---|---|---|
| 6,393,263 B1 | 5/2002 | Hayashi | 455/145 |
| 6,470,449 B1 | 10/2002 | Blandford | 713/178 |
| 6,556,512 B1 * | 4/2003 | Winkler | 368/47 |
| 2002/0064096 A1 * | 5/2002 | Ukita et al. | 368/66 |
| 2003/0004875 A1 | 1/2003 | Kramer et al. | 705/40 |

FOREIGN PATENT DOCUMENTS

| | | | |
|---|---|---|---|
| JP | 11-88742 A | 3/1999 |
| JP | 2002-90480 A | 3/2002 |
| JP | 2002-341068 A | 11/2002 |

OTHER PUBLICATIONS

International Search Report; PCT/EP 2004000798; May 24, 2004.

Written Opinion of the International Searching Authority; May 24, 2004.

* cited by examiner

MOBILE EQUIPMENT WITH TIME CONTROL FOR DRM SCHEMES

RELATED APPLICATIONS

The present application is a 35 U.S.C. §371 national phase application of PCT International Application No. PCT/EP2004/000798, having an international filing date of Jan. 29, 2004, and claiming priority to European Patent Application No. 03006246.7, filed Mar. 20, 2003, the disclosures of which are incorporated herein by reference in their entireties. The above PCT International Application was published in the English language and has International Publication No. WO 2004/084048 A1.

FIELD OF THE INVENTION

The invention relates to a mobile equipment with time control system for DRM (digital right management) schemes according to claim 1.

BACKGROUND OF THE INVENTION

The DRM schemes rely on time in order to verify the rendering rights. This results in the necessity of securing the clock in order to force correct application of the content protection rules. For a mobile equipment the securing of the clock is rendered difficult by various issues, e.g. the mobile equipment might not be necessarily registered to a network, the user needs to change the clock in order to adapt it to a different time zone or the user has to set a new time value in case the real time is lost for example during a change of battery. A time control system for mobile equipments is therefore required, which allows the user to change the clock under certain circumstances but limits the possible fraud made to a level, which is considered acceptable, without limiting the functionality of the mobile equipment.

A time recording and controlling system for a camera is revealed in document U.S. Pat. No. 5,526,079. It discloses a data recording system for a camera, which records information such as the time, the data, the name and a corporate symbol onto a recording medium used by the camera. If these data are lost, new values must be set by the user. A control system determines, if the new data are considered correct, in this case the new data are accepted. Otherwise the new time and date are not used and the data recording system is stopped or the camera is blocked and cannot be used.

The disadvantage of this system is the possible limited functionality of the camera after changing the data, e.g. when the camera still works but without the date and time function or when the camera is shut off completely.

SUMMARY OF THE INVENTION

It is therefore the object of the present invention to provide a system for mobile equipments, which enable the user to change the time information of the integrated clock within certain limits, without restricting the functionality of the mobile equipment, even if the new time does not lie within the predefined range.

This object is achieved by a system as defined in claim 1. Further embodiments of the invention are set out in the independent claims.

According to the present invention a mobile equipment for non stationary use is described comprising a real time clock (RTC) integrated in the mobile equipment for generating a real time information, a system time generator integrated in the mobile equipment for generating a system time information by adding an offset to the real time information given by the RTC, a non-volatile memory for the permanent storage of data and an input means for inputting instructions for changing the system time information.

Hereby, means are provided for limiting the possible changes of the system time information generated by the system time generator (9) to a preset time range and means are provided for limiting the possible reset value of the RTC according to the data stored in the non-volatile memory.

Advantageously the system comprises a power supply for the mobile equipment.

Further, advantageously the system comprises an output means for outputting the system time information generated by the system time generator.

Preferably the changed new system time is not allowed to differ from the real time information given by the RTC by more than a predefined value.

The predefined value can be a fixed value in minutes.

The predefined value can be dependent from a given inaccuracy of the time information generated by the RTC.

Further advantageously the time information of the RTC is stored periodically in the non-volatile memory.

Preferably the reset value of the RTC is not allowed to be earlier than the last stored time value in the non-volatile memory. The reset value is also stored in the non-volatile memory.

Advantageously the reset value is stored in the non-volatile memory.

BRIEF DESCRIPTION OF THE DRAWINGS

Embodiments of the invention will now be described, by way of example only, with reference to the accompanying drawing in which.

DETAILED DESCRIPTION OF EMBODIMENTS OF THE INVENTION

Figure 1:
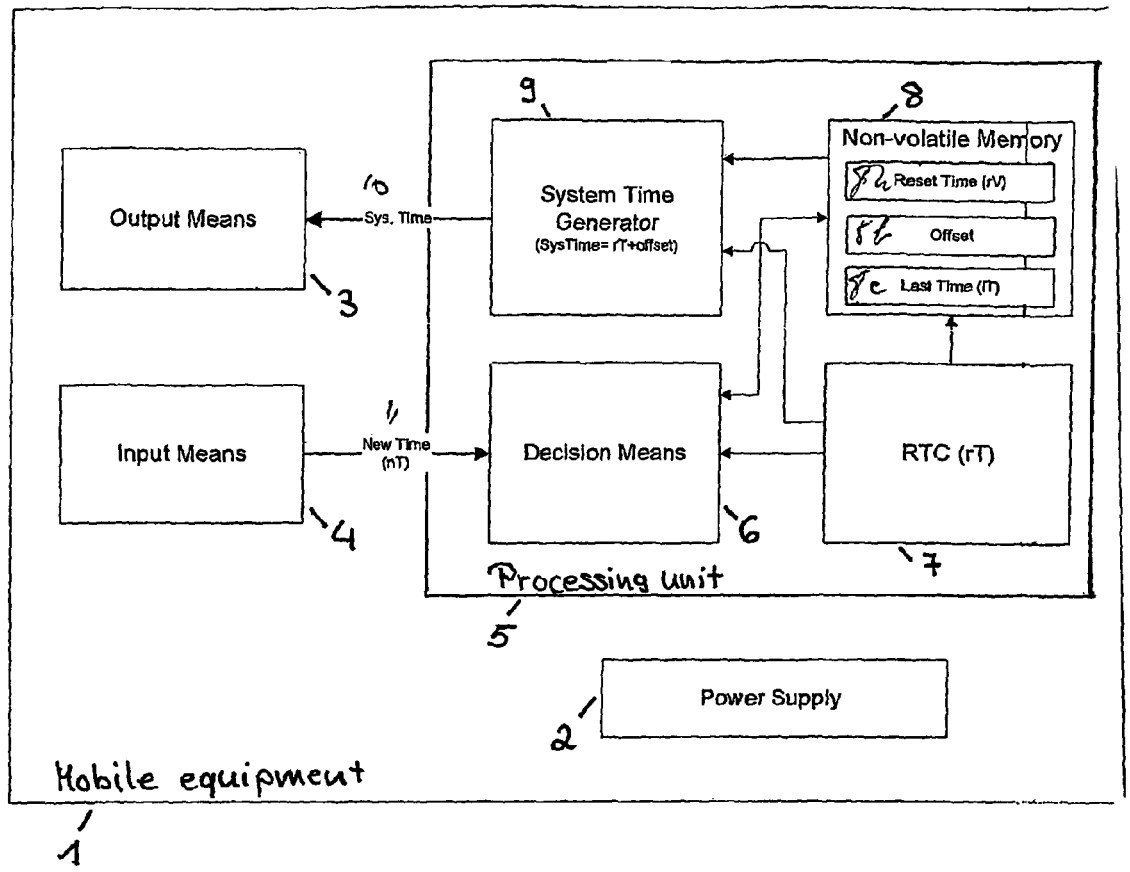
FIG. 1 is a block diagram showing schematically the elements of the system.

Referring to FIG. 1 the present invention comprises a mobile equipment 1 for non stationary use, e.g. a portable computer, a personal digital assistant (PDA), a mobile phone or recording devices.

Integrated in this mobile equipment 1 is a power supply 2. This may be one or more exchangeable batteries, rechargeable batteries, solar cells or a combination of these. So an almost continuous power supply with no or only little interruptions is possible.

Further, the mobile equipment 1 comprises an input means 4 and an output means 3. The input means 4, for instance a keypad, a touchpad, a mouse, recognition of speech, an interface for wireless transmission, e.g. via infrared, or for transmission with different means, e.g. a serial cable, enables the user to input data or information. The output means 3 may be a display, a loudspeaker, an interface for a printer, a fax or for connection to another portable or stationary device, outputs information, data or programs.

In addition, the mobile equipment 1 contains a processing unit 5 for handling data. The processing unit 5 comprises components and programs for receiving, reading, transferring, processing, storing or deleting data or information.

A real time clock (RTC) 7 serves for generating a real time and/or date information. Further, a system time generator 9 generates a system time by adding an offset to the real time information given by the RTC 7 and submits this system time information to the output means 3.

Further, during power supply the time information of the RTC 7 is periodically stored in a non-volatile memory 8, which serves for the permanent storage of data or information and permits no deletion of the data stored in it by the user. In addition, also the offset to the real time is stored in the non-volatile memory.

It is possible for the user to input a new or changed time and/or date information for the system time. To prevent fraud or errors, the entering of a new time is restricted by certain conditions. Therefore, the new time information input by the user is transmitted to a decision means 6, which checks the new time and decides, whether it is accepted or discarded.

The limitations of the new time information for the system time generated by the user are set out in the following.

In case, that the power supply for the RTC 7 was interrupted, e.g. when the battery was changed or not recharged, or when a malfunction of the power supply 2 occurs, the time information of the RTC 7 is deleted or gets lost. As mentioned above, the time of the RTC 7 during power supply is periodically stored in the non-volatile memory 8, which maintains this time information even during interruption of power supply. If the user after the lost of the time of the RTC 7 inputs a reset value for the RTC 7, this value is not allowed to be earlier than the last time information stored in the non-volatile memory. This condition can be expressed in the following inequality $$lT \leq rV,$$

where lT is the last time stored in the non-volatile memory and rV is the reset value input by the user. If the reset value passes the check of the decision means 6, then the reset value will be stored in the non-volatile memory 8 and used to change the RTC value. The real time offset will be set to 0 in the non-volatile memory 8. After resetting the RTC 7 to the reset value, the RTC 7 again starts generating a real time information which is periodically stored in the non-volatile memory.

A further limitation provides, that the new system time information input by the user lies within a predefined interval or range, or that the new system time is not allowed to differ from the real time generated by the RTC 7 by more than a predefined value. This condition can be expressed by the following inequality, whereby the new time nT inserted by the user depends on the real time rT generated by the RTC 7 according to $$rT-x \leq nT \leq rT+x,$$

where x is a predefined value in minutes. Hereby, it is only possible for the user to change the system time information generated by the system time generator 9, but not the real time information given by the RTC 7. If the user enters a new system time, and the new time lies within the given range, then the system time is changed by changing the offset of the RTC 7.

For example in case of travelling, the user must be able to change the system time when registering to a network in a different time zone. Hereby, a sensible value for x would be 24*60 minutes. This covers changes for all time zones including passing the date change meridian.

Another example is the clock change. If the system time of the mobile equipment 1 does not change automatically from summertime to wintertime or conversely, the user must be able to change the system time accordingly. In this case a sensible value for x would be 60 minutes.

The RTC 7 of the mobile equipment may have a certain inaccuracy, which then after a certain time passed results in an incorrect time information. The user therefore has the possibility, e.g. once a month, to change the system time information generated by the system time generator 9 or the real time information of the RTC 7 within a certain time range or interval, which depends on the inaccuracy given for the RTC 7: The higher the inaccuracy is, the wider is the interval or range for the allowed new time information. This condition can be expressed by the following inequality, whereby the new time nT depends on the real time rT given by the RTC 7 according to $$rT-a(rT-rV)-x \leq nT \leq rT-a(rT-rV)+x,$$

a is the inaccuracy of the time information given by the RTC 7, x is a predefined value in minutes and rV is the initial time used when the RTC 7 has been reset and has been stored in the non-volatile memory 8. Hereby, the value of the new time and the real time if necessary are e.g. converted from an absolute time and date into a value in minutes or seconds and inversely in order to facilitate the calculations.

If the new system time passes the verification of the decision means, then the offset to the RTC 7 time is updated as nT−rT, stored in the non-volatile memory and used to output a new system time by adding the new offset to the real time given by the RTC 7. This has the disadvantage, that with increasing time, e.g. after a few years, also the interval for the new time nT increases.

Therefore another possible function may be, that the real time information of the RTC 7 itself is changed by setting the real time value to the input new time value and setting the offset to 0. This has the advantage, that the interval for the possible new value nT does not change, this solution is therefore more accurate. In this second approach, the same verifications of the decision means 6 have to be performed.

Figure 2:
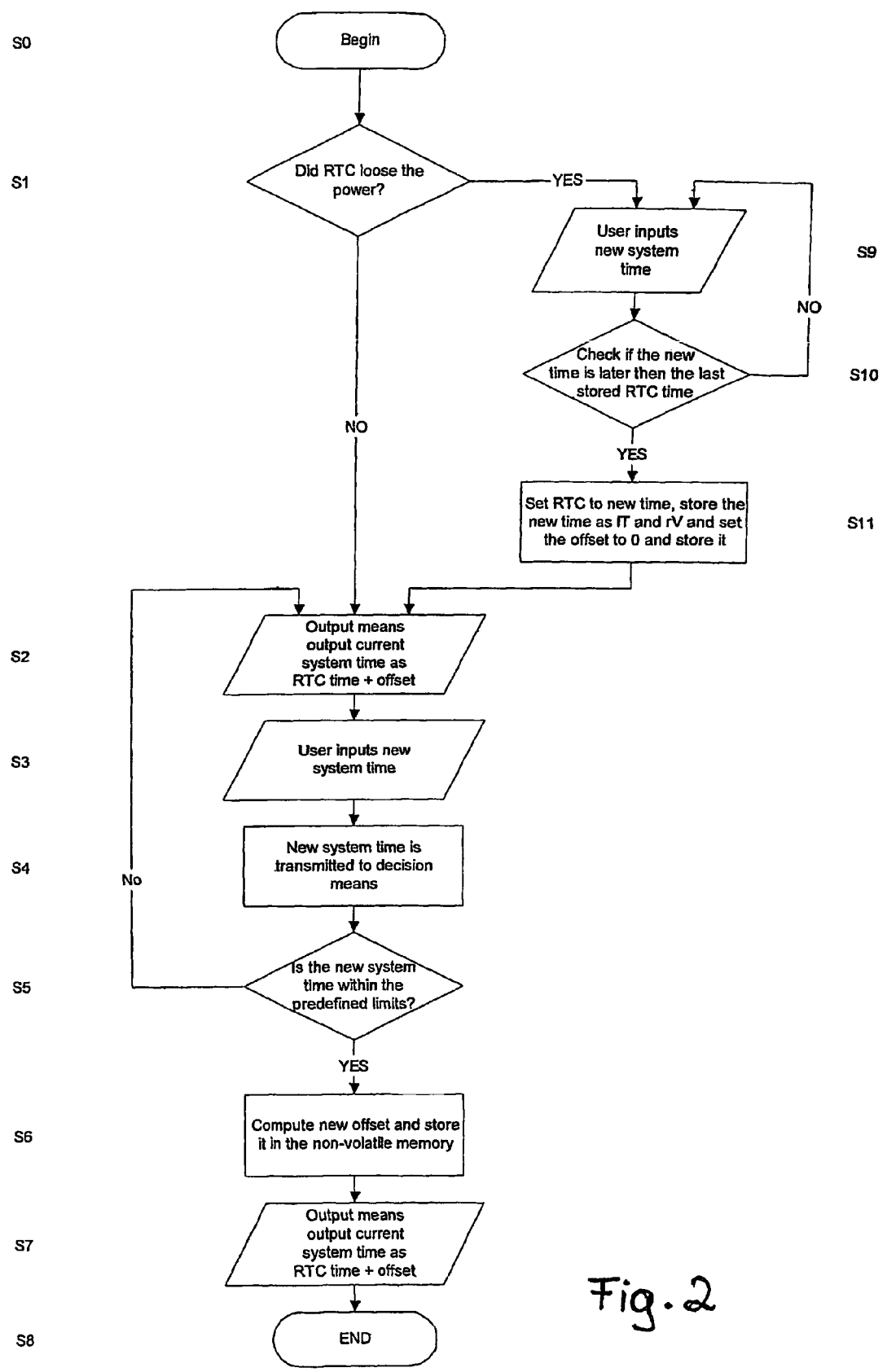
FIG. 2 is a flowchart showing the process of changing the time information.

With reference to FIG. 2, the steps for changing the system time by the user, are the following: The beginning of the procedure, e.g. the switching on of the mobile equipment 1, is indicated by the step S0. In a second step S1 it is checked, if the RTC 7 did loose power. If not, then in a step S2 the output means 3 outputs the current system time as real time given by the RTC 7 and the offset. Otherwise, if the RTC 7 lost power, the user in the step S9 inputs a reset value as new system time. In the next step S10 the decision means 6 checks, if the new time is later than the last time stored in the non-volatile memory 8. If not, then the process goes back to step S9 and the user has to input a new reset value time. Otherwise, according to step S11, the RTC 7 is set to the new time, the reset value is stored in the non-volatile memory 8, the offset is set to 0 and also stored in the non-volatile memory and the periodical storage of the real time information given by the RTC 7 is started. In the next step S2 the output means 3 outputs the current system time as real time given by the RTC 7 and the offset. If the user inputs a new system time in the step S3, this new system time is transmitted to the decision means 6 in a next step S4, where it is checked in step S5, if the new time lies within the predefined range. If not, the process returns to step S2 and the output means 3 outputs the current unchanged time. Otherwise, the new offset is computed and stored in the non-volatile memory in the step S6. In the next step S7 the output means 3 then outputs the system time as real time given by the RTC 7 and the changed offset. In a last step S8 the procedure ends, e.g. by switching off the mobile equipment 1.

The invention claimed is:

1. Mobile equipment for non stationary use, comprising:
a real time clock RTC integrated in the mobile equipment for generating a real time information;
a system time generator integrated in the mobile equipment for generating a system time information by adding an offset to the real time information given by the RTC;
an output means for outputting the system time information generated by the system time generator;
a non-volatile memory for the non-volatile storage of data;
an input means for inputting instructions for changing the system time information; and
a decision means for limiting the possible changes of the system time information generated by the system time generator to a preset time range, wherein:
the real time information of the RTC is stored periodically in the non-volatile memory;
said input means enables a user to input a reset time value for said RTC in case that the real time information from the RTC has been lost;
said decision means checks if the reset time value input by a user is later than the last time information of the RTC stored in the non-volatile memory and, in case the input reset time value passes the check, the RTC is set to the new time according to the reset time value.

2. The mobile equipment according to claim 1, wherein the user inputted reset time value is stored in the non-volatile memory.

3. The mobile equipment according to claim 1, wherein the decision means does not allow the RTC to be changed responsive to the user inputted reset time when the user inputted reset time differs from the real time information given by the RTC by more than a predefined value.

4. The mobile equipment according to claim 3, wherein the predefined value is a fixed value in minutes.

5. The mobile equipment according to claim 3, wherein the predefined value, which is used by the decision means to constrain changes to the RTC, is defined in response to a given inaccuracy of the time information generated by the RTC.

6. The mobile equipment according to claim 1, wherein the system comprises a power supply for the mobile equipment.

7. The mobile equipment according to claim 2, wherein the decision means does not allow the RTC to be changed responsive to the user inputted reset time when the user inputted reset time differs from the real time information given by the RTC by more than a predefined value.

8. The mobile equipment according to claim 4, wherein the predefined value, which is used by the decision means to constrain changes to the RTC, is defined in response to a given inaccuracy of the time information generated by the RTC.

9. The mobile equipment according to claim 5, wherein the system comprises a power supply for the mobile equipment.

* * * * *